April 4, 1950 H. R. SIMONS 2,503,222
COVER HOLDING CLIP
Filed Oct. 23, 1945
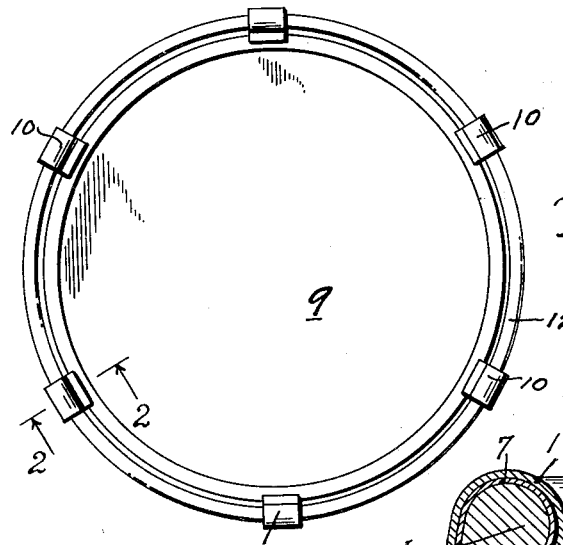
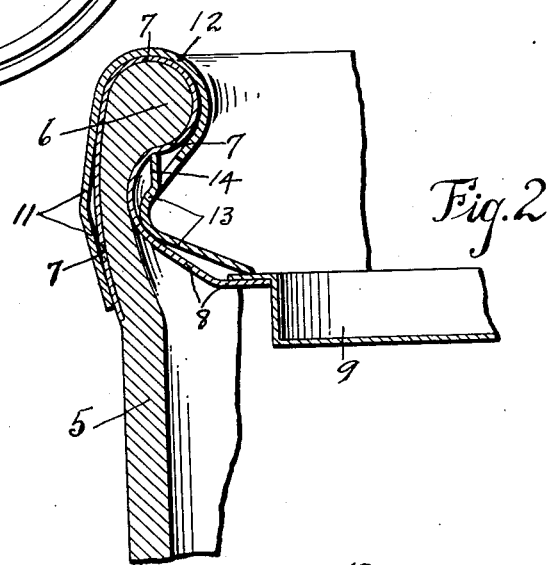
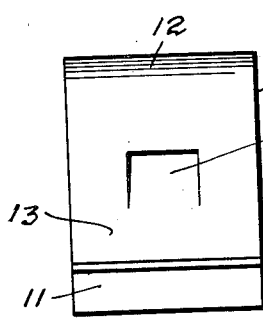
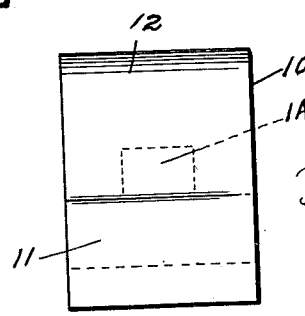
INVENTOR,
Herbert R. Simons
ATTORNEY.

Patented Apr. 4, 1950

2,503,222

UNITED STATES PATENT OFFICE 2,503,222
COVER HOLDING CLIP

Herbert R. Simons, Alhambra, Calif., assignor to Pacific All-Fiber Drums, Inc., Alhambra, Calif.

Application October 23, 1945, Serial No. 624,076

3 Claims. (Cl. 217—89)

This invention relates to holding clips designed to be applied around the top of a barrel or other container having a cover set therein for the purpose of holding said cover tightly in place.

Among the salient objects of this invention are: to provide a cover holding clip which is simple, practical and efficient and which is easily applied to the top of a container and which is effective in securing a cover in place to seal said container against leakage; to provide a holding clip which has a struck-out tongue or finger which automatically springs into place under an overhanging part of said container top as said clip is put into place.

Other objects and advantages of the invention will appear in connection with the following more detailed description thereof, with the accompanying sheet of drawings. In the drawings Figure 1 is a top plan view of a container, with cover in place, with several cover holding clips embodying my invention in place;

Figure 2 is an enlarged vertical sectional view through the top of a container, cover and holding clip in place, on line 2—2, Fig. 1;

Figure 3 is a front elevation of a holding clip; and

Figure 4 is an outside elevation thereof.

Referring in detail to the drawings, 5 designates a container wall, shown formed around its top edge with a bulge, or overhanging ridge 6. Mounted around said top edge, as a permanant part theerof, is a metal top 7, fitting tightly and permanently over the top edge and forming an inwardly and downwardly projecting cover-receiving top 8, and into which a metal cover 9 is shown seated.

The present invention, however, has to do with a cover holding clip, designated 10, and having the outer, downwardly depending portion 11, adapted to hug the outside of the container top, and the loop portion 12 adapted to hug the top bulge or overhanging top edge of said cover, as shown in Fig. 2, and the inwardly and downwardly projected portion 13, adapted to rest upon the cover 9, as indicated for the purpose of holding said cover tightly in place.

A most important feature of this invention is a struck-out tongue or finger 14, adapted to spring under the overhanging bulge or portion 6 of the container top, whereby to hold said clip in place and to prevent accidental misplacement thereof, and making it necessary to use great force to remove said clip from its holding position when once put into place.

It will be understood that after the cover 9 has been put into place, as indicated in Fig. 2, that said holding clips are pressed down over the top edge of the annular metal top, and as this is done said tongue or finger 14 engages up under the overhanging portion 6 of said cover, and in such a way that the lower, holding end of said clip is held against springing up, except when great force is used.

I do not limit the invention to the exact details of construction and arrangement shown for explanatory purposes, except as I may be limited by the hereto appended claims forming a part of this specification.

I claim:

1. The combination with a container having an open top surrounded by an upstanding edge having an inner overhanging portion and a cover seated therein, of a cover holding clip formed to be sprung over said upstanding edge and said overhanging portion to yieldingly hug the same, the inner end of said clip bearing down upon said cover, said clip having an upstanding tongue positioned to spring under said overhanging portion for holding said clip in cover holding position.

2. The combination with a container having an open top surrounded by an upstanding edge covered with an annular metal top forming an annular bulge around the inner side of the top of said edge and forming the opening into said container and a cover seated therein, of a cover holding clip conforming to said top and designed to be sprung down over said bulge with its inner end bearing down upon said cover for holding it in place, said clip having an integral upstanding tongue positioned to spring under said bulge for holding said clip in cover holding position.

3. A container having its upper edge formed with an annular bulge around the inner face thereof, an annular metal top fitted upon and hugging said upper edge and conforming to the cross sectional form thereof, said metal top forming the mouth of said container, a cover seated in said mouth, and a holding clip conforming to the top edge of said container and designed to be sprung down over the same, to yieldingly hug the same around said bulge and on its opposite sides, the inner end of said clip bearing yieldingly down upon said cover and said clip having an upstanding tongue formed thereon to bear up under said bulge for holding said clip.

HERBERT R. SIMONS.

REFERENCES CITED

The following references are of record in the file of this patent:

UNITED STATES PATENTS

| Number | Name | Date |
| --- | --- | --- |
| 1,155,344 | Ellinger | Oct. 5, 1915 |
| 1,226,154 | Wheelock | May 15, 1917 |
| 1,381,846 | Maker et al. | June 14, 1921 |
| 1,485,136 | House | Feb. 26, 1924 |
| 1,653,465 | Montan et al. | Dec. 20, 1927 |
| 1,702,606 | Hulbert | Feb. 19, 1929 |
| 2,339,845 | Duwe | Jan. 25, 1944 |
| 2,390,750 | Tinnerman | Dec. 11, 1945 |

FOREIGN PATENTS

| Number | Country | Date |
| --- | --- | --- |
| 378,279 | Great Britain | Aug. 11, 1932 |